(12) United States Patent
Lin et al.

(10) Patent No.: US 12,363,683 B2
(45) Date of Patent: Jul. 15, 2025

(54) USER EQUIPMENT AND METHOD OF RESOURCE ALLOCATION OF SAME

(71) Applicant: GUANGDONG OPPO MOBILE TELECOMMUNICATIONS CORP., LTD., Dongguan (CN)

(72) Inventors: Huei-Ming Lin, South Yarra (AU); Zhenshan Zhao, Dongguan (CN); Qianxi Lu, Dongguan (CN)

(73) Assignee: Guangdong Oppo Mobile Telecommunications Corp., Ltd. (CN)

( * ) Notice: Subject to any disclaimer, the term of this patent is extended or adjusted under 35 U.S.C. 154(b) by 414 days.

(21) Appl. No.: 17/954,229

(22) Filed: Sep. 27, 2022

(65) Prior Publication Data
US 2023/0028098 A1   Jan. 26, 2023

Related U.S. Application Data

(63) Continuation of application No. PCT/CN2020/083776, filed on Apr. 8, 2020.

(51) Int. Cl.
*H04W 72/02* (2009.01)
*H04W 24/08* (2009.01)
(Continued)

(52) U.S. Cl.
CPC .......... *H04W 72/02* (2013.01); *H04W 24/08* (2013.01); *H04W 72/0446* (2013.01); *H04W 72/20* (2023.01)

(58) Field of Classification Search
CPC .. H04W 72/20; H04W 24/08; H04W 72/0446
(Continued)

(56) References Cited

U.S. PATENT DOCUMENTS

2016/0157218 A1\* 6/2016 Nam ................... H04B 7/0632
370/329
2018/0063816 A1   3/2018 Gulati et al.
(Continued)

FOREIGN PATENT DOCUMENTS

CN   106304351 A   1/2017
CN   108633048 A   10/2018
(Continued)

OTHER PUBLICATIONS

The First Office Action dated May 28, 2024 from Chinese patent application No. 202310085514.0.
(Continued)

*Primary Examiner* — Dang T Ton
(74) *Attorney, Agent, or Firm* — Quarles & Brady LLP (57) ABSTRACT

A user equipment and a method of resource allocation of the same are provided. The method includes performing monitoring on slots of a resource pool, excluding one or more sidelink resources from a candidate resource set in the resource pool, and selecting one or more sidelink resources using a timing based selection from the remaining candidate resource set or a resource selection window in the resource pool. This reduces risk of a pre-selected resource being taken-over or reserved by others and/or allows flexibility in a sidelink control information (SCI) signaling to be able to provide early indication/reservation of future sidelink resources, and subsequently improves overall system performance.

18 Claims, 6 Drawing Sheets

(51) Int. Cl.
*H04W 72/0446* (2023.01)
*H04W 72/20* (2023.01)

(58) Field of Classification Search
USPC .................................. 370/329, 401, 403
See application file for complete search history.

(56) References Cited

U.S. PATENT DOCUMENTS

| | | |
|---|---|---|
| 2019/0222981 A1 | 7/2019 | Lee et al. |
| 2020/0029245 A1 | 1/2020 | Khoryaev et al. |
| 2020/0036422 A1 | 1/2020 | Li et al. |
| 2020/0068531 A1 | 2/2020 | Sundberg et al. |
| 2024/0031997 A1* | 1/2024 | Lin .................. H04W 4/40 |

FOREIGN PATENT DOCUMENTS

| | | |
|---|---|---|
| CN | 109121209 A | 1/2019 |
| CN | 109391976 A | 2/2019 |
| EP | 3471477 A1 | 4/2019 |
| EP | 3522628 A1 | 8/2019 |
| EP | 3890423 A1 | 10/2021 |
| WO | 2018006313 A1 | 1/2018 |
| WO | 2018031086 A1 | 2/2018 |
| WO | 2021203974 A1 | 10/2021 |

OTHER PUBLICATIONS

International Search Report and the Written Opinion dated Dec. 30, 2020 from the International Searching Authority Re. Application No. PCT/CN2020/083776.
The supplementary European search report dated Apr. 20, 2023 from European patent Application No. 20930473.2.
Qualcomm Incorporated, "Sidelink Resource Allocation Mechanism for NR V2X", 3GPP Draft; R1-1907271_Sidelink Resource Allocation Mechanism for NR V2X, 3rd Generation Partnership Project (3GPP), Mobile Competence Centre ; 650, Route Des Lucioles ; F-06921 Sophia-Antipolis Cedex, vol. RAN WG1, No. Reno, USA; May 13, 2019-May 17, 2019, May 13, 2019 (May 13, 2019).
Samsung, "On Mode 2 for NR Sidelink", 3GPP Draft; R1-2000617, 3rd Generation Partnership Project (3GPP), Mobile Competence Centre ; 650, Route Des Lucioles ; F-06921 Sophia-Antipolis Cedex; France, vol. RAN WG1, No. e-Meeting; Feb. 24, 2020-Mar. 6, 2020, Feb. 14, 2020 (Feb. 14, 2020).
The Examination Report dated Dec. 12, 2023 from European patent application No. 20930473.2.
Notice of Reasons for Rejection dated Jan. 16, 2024 from the Japanese Application No. 2022-560239.
Qualcomm Incorporated, "Sidelink Resource Allocation Mechanism for NR V2X", 3GPP TSG RAN WG1 Meeting #100-e, R1-2000963, Feb. 15, 2020 (Feb. 15, 2020).
Huawei, HiSilicon, "Sidelink resource allocation mode 2 for NR V2X" , 3GPP TSG RAN WG1 Meeting #99, R1-1911884, Nov. 9, 2019 (Nov. 9, 2019).
Panasonic, "Remaining Issues on Sidelink Mode 2 Resource Allocation", 3GPP TSG RAN WG1 #100, R1-2000542, Feb. 14, 2020(Feb. 14, 2020).
CATT, "Discussion on resource allocation mechanism for sidelink Mode 2 in NR V2X" 3GPP TSG RAN WG1 Meeting #98bis, R1-1910329, Oct. 5, 2019(Oct. 5, 2019).
MediaTek Inc., "On sidelink mode-2 resource allocation", 3GPP TSG RAN WG1 Meeting #98bis, R1-1911067, Oct. 8, 2019(Oct. 8, 2019).
India Office Action dated Jan. 23, 2023; India Application No. 202227061485.
Notice of Reasons for Rejection dated Aug. 6, 2024 from Japanese Application No. 2022-560239.
Apple, "Remaining Details on Resource Allocation for Mode 2", 3GPP TSG RAN WG1 #100-e, R1-2000852, Feb. 15, 2020 (Feb. 15, 2020).
The Notice of Allowance dated Aug. 21, 2024 from Chinese patent application No. 202310085514.0.
First Office Action of the Korean application No. 10-2022-7039017, issued on May 14, 2025. 24 pages with English translation.
3GPP TSG Ran WG1 #100 R1-2000547, e-Meeting, Feb. 24-Mar. 6, 2020, Agenda Item: 7.2.4.2.2, Source: Fujitsu, Title: Remaining details on mode 2 resource allocation for NR V2X, Document for: Discussion/Decision, pp. 1-10.
3GPP Tsg Ran WG1 Meeting #100-e R1-2000183, Feb. 24-Mar. 6, 2020, Agenda Item: 7.2.4.2.2, Source: Huawei, HiSilicon, Title: Remaining details of sidelink resource allocation mode 2, Document for: Discussion and Decision, pp. 1-14.

\* cited by examiner

USER EQUIPMENT AND METHOD OF RESOURCE ALLOCATION OF SAME

CROSS REFERENCE

This application is a continuation of an International Application No. PCT/CN2020/083776, entitled "USER EQUIPMENT AND METHOD OF RESOURCE ALLOCATION OF SAME", filed on Apr. 8, 2020, which is incorporated by reference in the present application in its entirety.

BACKGROUND OF DISCLOSURE

1. Field of the Disclosure

The present disclosure relates to the field of communication systems, and more particularly, to a user equipment and a method of resource allocation of the same, which can provide a good communication performance and high reliability.

2. Description of the Related Art

In the development of a new sidelink (SL) transmission system based on the latest 5th generation-new radio (5G-NR) mobile technology for vehicle-to-everything (V2X) radio communication directly between user equipments (UEs), one of challenging tasks in a design is supporting UEs to operate autonomously almost entirely on its own with minimum (pre-)configurations and sometimes without any assistance from a mobile network. That is, SL UEs operating in this autonomous mode (as known as mode 2) should be able to detect and decode each other's messages and select resources individually to transmit own messages to others with a required performance in reliability and latency. However, when there are many UEs operating SL communication at the same time and sharing the same radio carrier and mode 2 resource pool, it is difficult to avoid transmission (Tx) collisions among the UEs and maintaining a required target performance. Furthermore, due to the nature of UE autonomous selection of SL resources in mode 2, it is possible for another UE to indicate/reserve or pre-empt one or more already pre-selected or announced resources by the original Tx-UE and forced the original UE to find and reselect replacement resources. If this operation happens frequently in SL communication, a system may become unstable and unreliable where information message packets could be dropped unexpectedly and not received by others.

Therefore, there is a need for a user equipment and a method of resource allocation of the same, which can provide a good communication performance and high reliability.

SUMMARY

An object of the present disclosure is to propose a user equipment and a method of resource allocation of the same, which can reduce risk of a pre-selected resource being taken-over or reserved by others and/or allow flexibility in a sidelink control information (SCI) signaling to be able to provide early indication/reservation of future sidelink resources, and subsequently improve overall system performance.

In a first aspect of the present disclosure, a user equipment of resource allocation includes a memory, a transceiver, and a processor coupled to the memory and the transceiver. The processor is configured to perform monitoring on slots of a resource pool, exclude one or more sidelink resources from a candidate resource set in the resource pool, and select one or more sidelink resources using a timing based selection from the remaining candidate resource set in the resource pool.

In a second aspect of the present disclosure, a method of resource allocation of a user equipment includes performing monitoring on slots of a resource pool, excluding one or more sidelink resources from a candidate resource set in the resource pool, and selecting one or more sidelink resources using a timing based selection from the remaining candidate resource set in the resource pool.

In a third aspect of the present disclosure, a non-transitory machine-readable storage medium has stored thereon instructions that, when executed by a computer, cause the computer to perform the above method.

In a fourth aspect of the present disclosure, a terminal device includes a processor and a memory configured to store a computer program. The processor is configured to execute the computer program stored in the memory to perform the above method.

In a fifth aspect of the present disclosure, a base station includes a processor and a memory configured to store a computer program. The processor is configured to execute the computer program stored in the memory to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In some embodiments of the present disclosure, it is necessary and beneficial to enhance a current resource selection mechanism to avoid triggering a process of resource reselection as much as possible to save user equipment (UE) processing power and complexity, and frequently changing indicated resources in the case when another UE's trying to adopt their resource selection based on this indication (e.g., in unicast and groupcast scenarios). In addition, in order to ensure and to improve performance of SL communication and to minimize risk of transmission (Tx) collision between UEs, it is beneficial and essential to reserve selected resources in advance or as early as possible so that others will avoid selecting the same resources.

In some embodiments of the present disclosure, timing-based resource selection scheme is provided, it aims to adapt Tx-UE's resource selection strategy to an assigned transmission profile (such as priority, packet delay budget (PDB)), to spread out SL resource congestion, to minimize Tx collision, and to reduce resource re-selection probability. Other benefits of adopting a timing-based resource selection method for an initial transmission and/or a retransmission of a transport block (TB) in new radio (NR) sidelink communication include at least one of the followings. 1. Minimizing risk of a pre-selected resource being taken-over or reserved by others. 2. Allowing flexibility in a sidelink control information (SCI) signaling to be able to provide early indication/reservation of future resources, and subsequently improving overall system performance.

Figure 1:
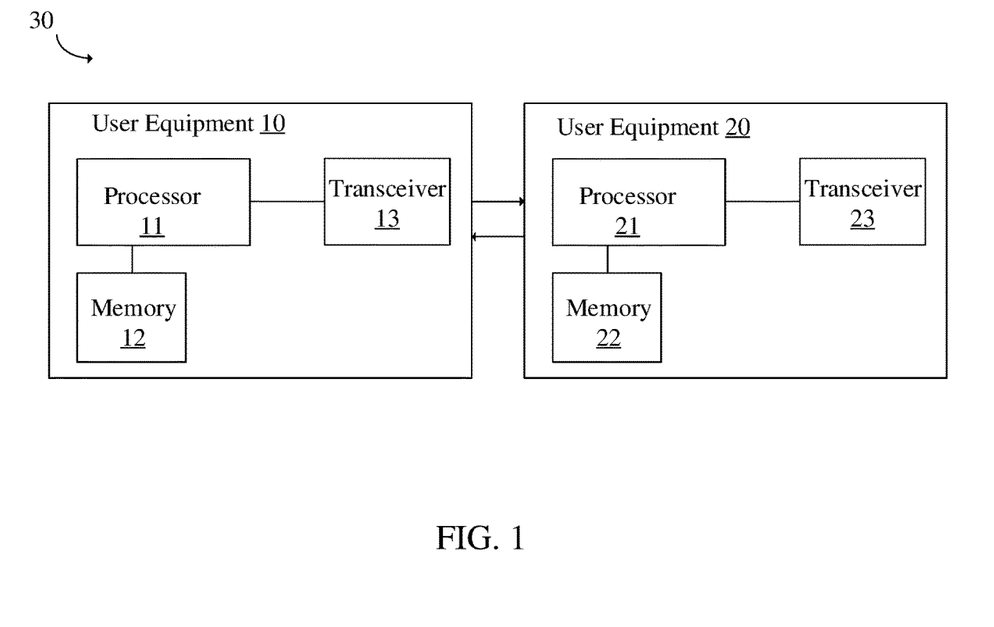
FIG. 1 is a block diagram of user equipments (UEs) of resource allocation in a communication network system according to an embodiment of the present disclosure.

FIG. 1 illustrates that, in some embodiments, user equipments (UE) 10 and 20 of resource allocation in a communication network system 30 according to an embodiment of the present disclosure are provided. The communication network system 30 includes the UE 10 and the UE 20. The UE 10 may include a memory 12, a transceiver 13, and a processor 11 coupled to the memory 12, the transceiver 13. The UE 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21 and transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) long term evolution (LTE) and new radio (NR) Release 16 and beyond. UEs are communicated with each other directly via a sidelink interface such as a PC5 interface. Some embodiments of the present disclosure relate to sidelink communication technology in 3GPP NR release 16 and beyond.

In some embodiments, the processor 11 is configured to perform monitoring on slots of a resource pool, exclude one or more sidelink resources from a candidate resource set in the resource pool, and select one or more sidelink resources using a timing based selection from the remaining candidate resource set or a resource selection window in the resource pool. This reduces risk of a pre-selected resource being taken-over or reserved by others and/or allows flexibility in a sidelink control information (SCI) signaling to be able to provide early indication/reservation of future sidelink resources, and subsequently improves overall system performance.

In some embodiments, the resource pool is network configured or pre-configured. In some embodiments, the resource pool comprises a selected/mode 2 resource pool for sidelink transmission. In some embodiments, monitoring on the slots of the resource pool is performed by decoding a physical sidelink control channel (PSCCH) and measuring a reference signal received power (RSRP) during a sensing window in the resource pool. In some embodiments, excluding one or more sidelink resources from the candidate resource set is according to one or more information relating to L1 priority, time and frequency resource assignments, and reservation periodicity from a sidelink control information (SCI) and a RSRP threshold.

In some embodiments, selecting one or more sidelink resources using the timing based selection from the remaining candidate resource set or the resource selection window is according to at least one of the followings: a time-portion based selection scheme, wherein one or more time portions within the remaining candidate resource set or the resource selection window are prioritized or have a high ranking for selection; or a chain-based selection scheme, wherein one or more slot regions within a time constraint of a maximum time gap from a previous sidelink resource and/or a next sidelink resource are identified for selection.

In some embodiments, in the time-portion based selection scheme, one or more sidelink resources are selected randomly from one or more time portions within the remaining candidate resource set or the resource selection window. In some embodiments, in the time-portion based selection scheme, one or more time portions within the remaining candidate resource set or the resource selection window are divided equally according to at least one of the followings:

$$\frac{(T_2 - T_1)}{\max NumTX} \text{ or } \frac{\text{time period of } S'_A}{\max NumTX},$$

where $T_2-T_1$ is a time period of the resource selection window, maxNumTX is the maximum number of transmissions that is allowed for a transport block (TB), and $S'_A$ is the remaining candidate resource set; or $$\frac{(T_2-T_1)}{\text{max}NumResource} \text{ or } \frac{\text{time period of } S'_A}{\text{max}NumResource},$$

where maxNumResource is a radio resource control (RRC) configured parameter for setting the maximum number of sidelink resources for transmitting PSCCH/physical sidelink shared channel (PSSCH) that can be signaled by a single SCI; or $$\frac{(T_2-T_1)}{numResource} \text{ or } \frac{\text{time period of } S'_A}{numResource},$$

where numResource is a number of sidelink resources intended to be signaled by the processor 11 in one SCI for a TB. In some embodiments, maxNumTX is equal to 8, 16, or 32. In some embodiments, maxNumResource is equal to 2 or 3. In some embodiments, numResource is equal to 1, 2, or 3.

In some embodiments, in the time-portion based selection scheme, a first time-portion of the remaining candidate resource set or the resource selection window is used for resource selection, the first time-portion is defined according to at least one of the followings: first X % of time of the remaining candidate resource set or the resource selection window, where X is pre-defined, network configured, or pre-configured; or first Z slots within the remaining candidate resource set or the resource selection window, where Z is pre-defined, network configured, or pre-configured; or first Y sidelink resources from the remaining candidate resource set or the resource selection window, where Y is pre-defined, network configured, or pre-configured; or a window $(T_{2,min}-T_1)$, where $T_{2,min}$ is an RRC configured parameter which sets a minimum resource selection time window for an associated TB with a priority value. In some embodiments, X may be equal to 5, 10, or 20; In some embodiments, Z may be equal to 1, 2, 5, or 10. In some embodiments, Y may be equal to 1, 2, 3, 5, or 10.

In some embodiments, in the chain-based selection scheme, one or more sidelink resources are selected randomly from one or more slot regions. In some embodiments, in the chain-based selection scheme, one or more slot regions within the remaining candidate resource set or the resource selection window are identified according to at least one of the followings: a lower time bound of a slot region is defined by a time gap before a time slot of the next sidelink resource, and an upper time bound of the slot region is defined by a time gap after a time slot of the previous sidelink resource; or the lower time bound and the upper time bound of the slot region are defined by a time gap before and after the time slot of the next sidelink resource, respectively; or the upper time bound of the slot region is defined by a time gap after the time slot of the previous resource. In some embodiments, the maximum of all time gaps is smaller than or equal to 32 slots. In some embodiments, if there is no available/candidate sidelink resource between the lower time bound and the upper time bound, the processor re-selects replacement sidelink resources including the previous and/or the next resources. In some embodiments, the re-selected replacement sidelink resources satisfy 32 slots time restriction between any two consecutive sidelink resources.

Figure 2:
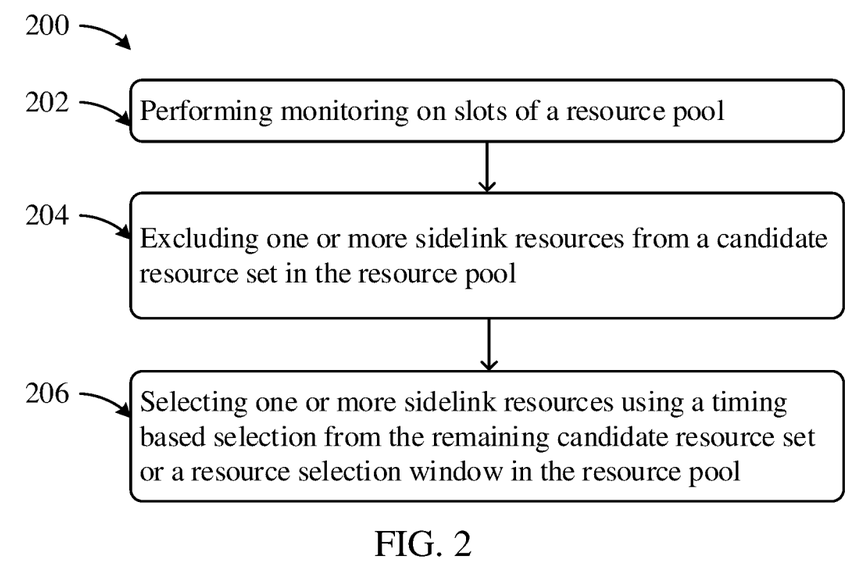
FIG. 2 is a flowchart illustrating a method of resource allocation of a user equipment according to an embodiment of the present disclosure.

FIG. 2 illustrates a method 200 of resource allocation of a UE according to an embodiment of the present disclosure. In some embodiments, the method 200 includes: a block 202, performing monitoring on slots of a resource pool, a block 204, excluding one or more sidelink resources from a candidate resource set in the resource pool, and a block 206, selecting one or more sidelink resources using a timing based selection from the remaining candidate resource set or a resource selection window in the resource pool. This reduces risk of a pre-selected resource being taken-over or reserved by others and/or allows flexibility in a sidelink control information (SCI) signaling to be able to provide early indication/reservation of future sidelink resources, and subsequently improves overall system performance.

In some embodiments, the resource pool is network configured or pre-configured. In some embodiments, the resource pool comprises a selected/mode 2 resource pool for sidelink transmission. In some embodiments, monitoring on the slots of the resource pool is performed by decoding a physical sidelink control channel (PSCCH) and measuring a reference signal received power (RSRP) during a sensing window in the resource pool. In some embodiments, excluding one or more sidelink resources from the candidate resource set is according to one or more information relating to L1 priority, time and frequency resource assignments, and reservation periodicity from a sidelink control information (SCI) and a RSRP threshold.

In some embodiments, selecting one or more sidelink resources using the timing based selection from the remaining candidate resource set or the resource selection window is according to at least one of the followings: a time-portion based selection scheme, wherein one or more time portions within the remaining candidate resource set or the resource selection window are prioritized or have a high ranking for selection; or a chain-based selection scheme, wherein one or more slot regions within a time constraint of a maximum time gap from a previous sidelink resource and/or a next sidelink resource are identified for selection.

In some embodiments, in the time-portion based selection scheme, one or more sidelink resources are selected randomly from one or more time portions within the remaining candidate resource set or the resource selection window. In some embodiments, in the time-portion based selection scheme, one or more time portions within the remaining candidate resource set or the resource selection window are divided equally according to at least one of the followings:

$$\frac{(T_2-T_1)}{\text{max}NumTX} \text{ or } \frac{\text{time period of } S'_A}{\text{max}NumTX},$$

where $T_2-T_1$ is a time period of the resource selection window, maxNumTX is the maximum number of transmissions that is allowed for a transport block (TB), and $S'_A$ is the remaining candidate resource set; or $$\frac{(T_2-T_1)}{\text{max}NumResource} \text{ or } \frac{\text{time period of } S'_A}{\text{max}NumResource},$$

where maxNumResource is a radio resource control (RRC) configured parameter for setting the maximum number of sidelink resources for transmitting PSCCH/physical sidelink shared channel (PSSCH) that can be signaled by a single SCI; or $$\frac{(T_2 - T_1)}{numResource} \text{ or } \frac{\text{time period of } S'_A}{numResource},$$

where numResource is a number of sidelink resources intended to be signaled by the UE in one SCI for a TB. In some embodiments, maxNumTX is equal to 8, 16, or 32. In some embodiments, maxNumResource is equal to 2 or 3. In some embodiments, numResource is equal to 1, 2, or 3.

In some embodiments, in the time-portion based selection scheme, a first time-portion of the remaining candidate resource set or the resource selection window is used for resource selection, the first time-portion is defined according to at least one of the followings: first X % of time of the remaining candidate resource set or the resource selection window, where X is pre-defined, network configured, or pre-configured; or first Z slots within the remaining candidate resource set or the resource selection window, where Z is pre-defined, network configured, or pre-configured; or first Y sidelink resources from the remaining candidate resource set or the resource selection window, where Y is pre-defined, network configured, or pre-configured; or a window $(T_{2,min} - T_1)$, where $T_{2,min}$ is an RRC configured parameter which sets a minimum resource selection time window for an associated TB with a priority value. In some embodiments, X may be equal to 5, 10, or 20; In some embodiments, Z may be equal to 1, 2, 5, or 10. In some embodiments, Y may be equal to 1, 2, 3, 5, or 10.

In some embodiments, in the chain-based selection scheme, one or more sidelink resources are selected randomly from one or more slot regions. In some embodiments, in the chain-based selection scheme, one or more slot regions within the remaining candidate resource set or the resource selection window are identified according to at least one of the followings: a lower time bound of a slot region is defined by a time gap before a time slot of the next sidelink resource, and an upper time bound of the slot region is defined by a time gap after a time slot of the previous sidelink resource; or the lower time bound and the upper time bound of the slot region are defined by a time gap before and after the time slot of the next sidelink resource, respectively; or the upper time bound of the slot region is defined by a time gap after the time slot of the previous resource. In some embodiments, the maximum of all time gaps is smaller than or equal to 32 slots. In some embodiments, if there is no available/candidate sidelink resource between the lower time bound and the upper time bound, the processor re-selects replacement sidelink resources including the previous and/or the next resources. In some embodiments, the re-selected replacement sidelink resources satisfy 32 slots time restriction between any two consecutive sidelink resources.

Figure 3:
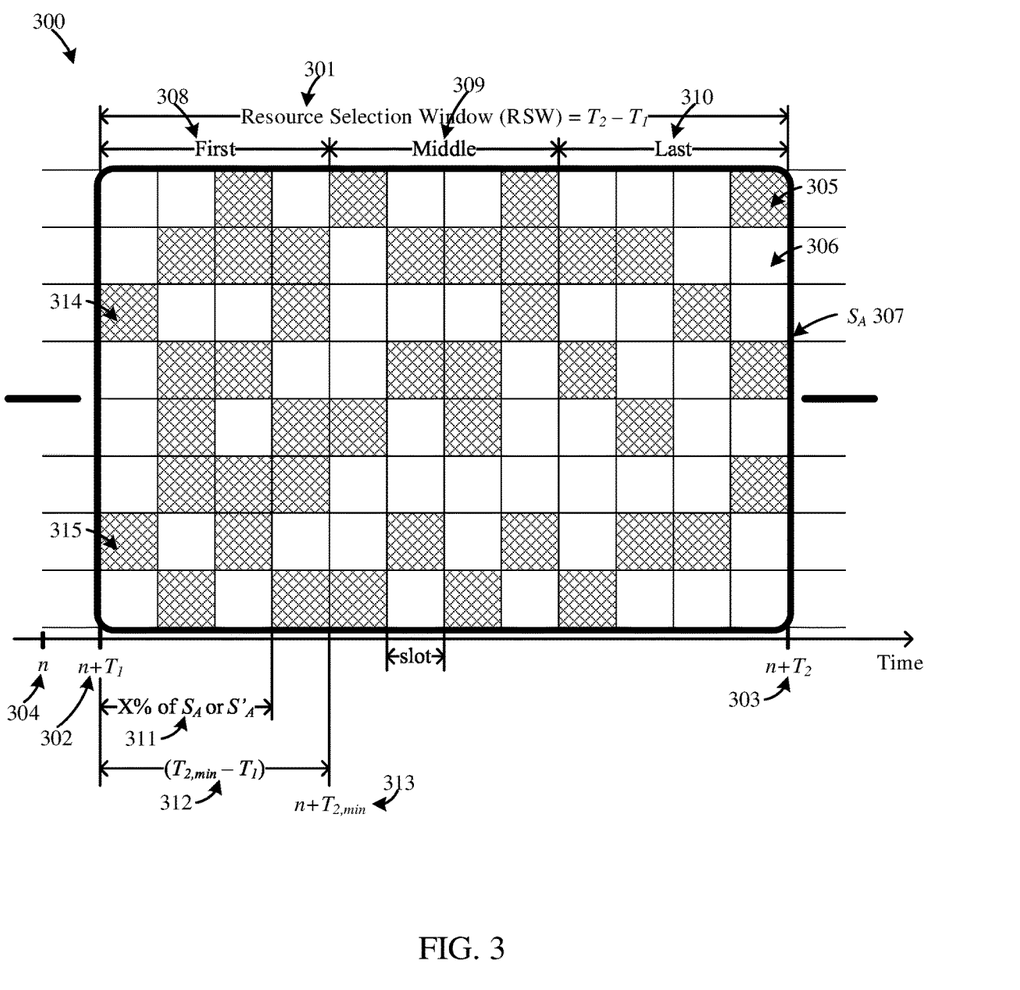
FIG. 3 is an exemplary illustration of a time-portion based resource (re)selection scheme according to an embodiment of the present disclosure.

FIG. 3 is an exemplary illustration of a time-portion based resource (re)selection scheme according to an embodiment of the present disclosure. FIG. 3 illustrates that in some embodiments, a UE determines a set of slots, which represents a resource selection window (RSW) 301 between $n+T_1$ 302 and $n+T_2$ 303, for a (pre-)configured sidelink selected/mode 2 resource pool after a resource allocation procedure trigger at time n 304, and also sets up/initializes a candidate resource set for a RSW, $S_A$ 307, containing all applicable sidelink (SL) resources with suitable sub-channel size for transmitting physical sidelink shared channel (PSSCH) and PSCCH. Let's denote all the applicable SL resources as square boxes for a candidate resource set $S_A$, within which containing all of shaded boxes 305 and clear boxes 306. The UE then excludes from, the candidate resource set $S_A$ 307, all SL resources that are indicated/reserved by SCIs received during a sensing window and an associated RSRP level measured is higher than a corresponding RSRP threshold (clear boxes). Denoting these reserved resources/clear boxes as 306. Then the shaded boxes 305 would be the remaining candidate resources (hereon denoted as set $S'_A$) that can be potentially selected for SL transmission by the Tx-UE.

Currently for the existing resource selection procedure defined by 3GPP in LTE sidelink mode 4 and NR sidelink mode 2 operations, it mainly consists of a random selection of one or more SL resources from the remaining candidate resources within the set $S'_A$. However, as described previously, the outcome of this random selection could be a set of SL resources that are concentrated in only a few time portions/areas of the RSW (e.g., middle or later portions of the RSW) and causing those portions of the resource pool to be more congested than others. Furthermore, this random selection scheme also presents a higher risk for the selected and even reserved resources of being indicated/announced or pre-empted by another UE if the time gap between resource selection and the actual transmission is wide. Additionally, if a randomly selected resource is not within a signaling time restriction (e.g., 32 slots) from a previous and/or next already pre-selected resource, then the randomly selected resource cannot be signaled together in a same or by an earlier SCI, and as such future resources cannot be reserved in advanced to minimize Tx collision. To mitigate these problems, the following resource selection schemes are proposed.

Note that the following proposed two resource selection schemes are not competing alternatives to each other, but rather they can be applied individually or in conjunction with one another depending on the scenario for resource (re)selection. Suitable scenarios or use cases for each scheme will be further described in the respective section.

First Aspect (Time-Portion Based Resource (Re)Selection):

For the time-portion based resource (re)selection scheme, one or multiple time-portions within the remaining candidate resource set or RSW can be identified according to one of the following methods. Benefits: By using the time-portion based scheme, it helps to spread out resource utilization, reduces resource congestion and in turn minimizes transmission collisions. Furthermore, it also reduces the chance of a pre-selected resource being taken-over or pre-empted by another UE.

In some embodiments, For the $1^{st}$ proposed resource (re)selection scheme, it is a time-portion based method wherein a period of the RSW $(T_2-T_1)$ or the remaining candidate resource set $(S'_A)$ is arranged into one or multiple time-portions and/or the Tx-UE identifies one or more certain time-portion(s) of the RSW $(T_2-T_1)$ or the remaining candidate resource set $(S'_A)$, and from which the Tx-UE selects SL resource(s) for its transmission. By selecting resource from a period that belong to a certain time-portion (e.g., first/middle/later portions), it helps to spread out probability of Tx collisions due to resource congestion, to satisfy short packet delay budget of a TB, and/or to minimize the risk of a pre-selected resource being taken-over or reserved by another UE.

In some embodiments, to arrange the period of RSW or the remaining candidate resource set ($S'_A$) into one or more multiple time-portions, the period is divided according to at least one of the followings.

1.

$$\frac{(T_2 - T_1)}{\text{max}NumTX} \text{ or } \frac{\text{time period of } S'_A}{\text{max}NumTX},$$

where maxNumTX is the maximum number of (re)transmission that is allowed for a TB (e.g. 8, 16 or 32). When the period of RSW or the remaining candidate resource set ($S'_A$) is divided by the maximum number of (re)transmissions for a TB, the Tx-UE randomly selects one SL resource from each of the divided time-portion to spread-out the transmission load across the entire RSW or the remaining candidate resource set ($S'_A$), and thus minimizing transmission congestion to the resource pool and Tx collisions. This resource selection approach is particularly suited for blind-based retransmission, where the Tx-UE can ensure the selected SL resources are within the remaining packet delay budget (PDB) of the TB by setting $T_2$=remaining PDB.

2.

$$\frac{(T_2 - T_1)}{\text{max}NumResource} \text{ or } \frac{\text{time period of } S'_A}{\text{max}NumResource},$$

where maxNumResource is an RRC (pre-) configured parameter for setting the maximum number of SL resources for transmitting PSCCH/PSSCH that can be signaled by a single SCI (e.g. 2 or 3). When the period of RSW or the remaining candidate resource set ($S'_A$) is divided by the maximum number of SL resources that can be signaled in a SCI, the Tx-UE randomly selects one SL resource from each of the divided time-portion to spread-out the selection across the entire RSW or the remaining candidate resource set ($S'_A$). Furthermore, the Tx-UE can also ensure that the selected resources from the multiple time-portions are within 32 slots from each other, so that the selected resources can be signaled by one SCI. This is exemplarily illustrated by diagram 300 in FIG. 3 when the maxNumResource=3. In this case, it is the same as dividing the RSW, $T_2-T_1$ 301, equally into three time portions, a first time portion 308, a middle time portion 309, and a last time portion 310, and the Tx-UE can randomly select a SL resource (one of shaded resources 305) from each of the time portions.

3.

$$\frac{(T_2 - T_1)}{numResource} \text{ or } \frac{\text{time period of } S'_A}{numResource},$$

where numResource is the number of SL resources intended to be signaled by the UE in one SCI for a TB (e.g. 1, 2 or 3). When the period of RSW or the remaining candidate resource set ($S'_A$) is divided by the number of intended SL resources to be signaled in a SCI, the Tx-UE randomly selects one SL resource from each of the divided time-portion. If number of time-portion is more than one, the Tx-UE can ensure that the selected resources from the multiple time portions are within 32 slots from each other, so that the selected resources can be signaled by the same SCI. This resource selection approach is suited for hybrid automatic repeat request (HARD) feedback-based retransmission, where the selection of SL resources to be used is often only performed after receiving the HARQ feedback from a receiver UE to avoid unnecessary future resource booking or reservation.

In addition to the above described usage scenarios of dividing the RSW or remaining candidate resource set $S'_A$ into a first time-portion, a middle time-portion, and a last time-portion to be in line with SCI signaling, this time-portion based resource selection can be also useful in the following usages. For example, the first time-portion 308 is useful for selecting resources for the initial transmission of a TB to reduce the chance of the selected resources being pre-empted or reserved by another UE and early reservation of retransmission resources. The middle time-portion(s) 309 is/are useful for selecting both blind-based and HARQ feedback-based retransmission resources. And, both the middle time-portion 309 and the last time-portion 310 are useful for selecting retransmission resources to reduce resource usage congestion and minimize the chances of Tx-collision.

In some cases, the Tx-UE may identify one or more certain time-portions of the RSW 301 or the remaining candidate resource set ($S'_A$) to be more important/critical or suitable/relevant for (re)selecting SL resources. For example, high priority TBs are often associated with a short latency requirement (i.e., a small PDB). In order to satisfy tight latency requirement and at the same time ensuring high transmission reliability is met for the high priority TB s (e.g., to allow sufficient resources/opportunities for retransmission), the Tx-UE identifies the first time-portion after the resource selection trigger and selects one or more SL resources within to send the initial transmission for a TB and possibly retransmissions as well. On the other hand, when the packet latency requirement for a TB is not as stringent or when it is relatively relaxed, the Tx-UE can try to (re)select resources from time-portions with less resource congestion. Usually, due to TBs with small PDB need to be sent as early as possible, early time-portions are often more congested than others. As such, the Tx-UE can try to (re)select SL resources from the middle or last time-portions of the RSW or the remaining candidate resource set $S'_A$, for example when the measured channel busy ratio (CBR) or channel occupancy ratio (CR) for a time-portion is less than a certain M %, where M could be 60, 50, or less. Or the Tx-UE can avoid (re)selecting resources from time-portions that have CBR or CR higher than M %.

In some embodiments, in order to send at least an initial transmission of a TB as quickly as possible after a resource (re)selection trigger, the first time-portion within the RSW or the remaining candidate resource set ($S'_A$) could be defined or (pre-)configured in at least one of the following ways (in reference to diagram 300 in FIG. 3):

1. First X % of time of the RSW (set $S_A$) or the remaining candidate resource set ($S'_A$) 311, where X could be 5, 10, 20. Alternatively, this could be expressed in terms of number of slots (e.g., first Z slots within the RSW or the remaining candidate resource set $S'_A$, where Z could be 1, 2, 5, or 10).

2. First Y resources from the RSW (set $S_A$) or the remaining candidate resource set ($S'_A$) 311, for example Y could be 1, 2, 3, 5, or 10.

3. The window ($T_{2,min}-T_1$) 312, where $T_{2,min}$ in (n+ $T_{2,min}$) 313 is an RRC (pre-)configured parameter which sets a minimum resource selection time window for the associated TB with a priority value p.

If there are more than one candidate resources within the first time-portion, the Tx-UE randomly selects one or more resources for its initial transmission and/or retransmissions of a TB. For example, if the 1st slot of the RSW 301 or the remaining candidate resource set (S'$_A$) is identified/set as the time-portion where the Tx-UE can select its first transmission resource from (for either an initial transmission or retransmission of a TB) and there are multiple candidate resources available in the 1st slot 314 and 315, the Tx-UE randomly selects one of these two/available resources.

Second Aspect (Chain-Based Resource (Re)Selection and Reservation):

For the chain-based resource (re)selection scheme, one or multiple slot regions within the remaining candidate resource set or RSW is identified according to one of the following methods. Benefits: By using the chain-based scheme, it ensures a newly selected SL resource is able to signal/reserve the next selected resource in a same SCI, and/or the newly selected SL resource is able to be signaled/reserved by the previous selected resource in a same SCI, for the purpose of early/chain-based reservation to reduce Tx collision in SL communication.

In some embodiments, in addition to the above time-portion based scheme that can be used by a SL transmitting UE to (re)select resource(s) for the initial and/or retransmissions of a TB, another resource (re)selection scheme that can be additionally adopted by the Tx-UE is a chain-based method to ensure that a newly selected resource can be indicated by at least one earlier SCI and/or the next pre-selected or already announced/signaled resource can be indicated by the newly (re)selected resource. To achieve this early/chain-based reservation, the selection or replacement of resources can comply with criteria that a newly selected resource should be in a slot from the RSW and within a maximum time gap from the previous and/or the next already pre-selected or announced/signaled resources. That is, the time gap can be smaller than or equal to 32 slots since this is the maximum time length currently supported by the time resource assignment parameter in SCI format 0-1. As such, this chain-based resource (re)selection scheme is ideally suitable for re-selection or re-evaluation of SL resources that have been pre-empted or announced/signaled by another UE before the actual SL transmission.

As part of sidelink mode 2 resource allocation mechanism currently defined in 3GPP, a Tx-UE is allowed to perform re-evaluation of SL resources that have been previously selected but not yet announced/signaled by the Tx-UE (these resources are also commonly known as pre-selected resources), and re-select any of the pre-selected resources if it is no longer available (e.g. no longer exist in the remaining candidate resource set S'$_A$) due to announcement/reservation of the same resource from another UE. However, if the re-selection of a pre-selected resource (finding a replacement resource) is just a random selection within the RSW or the remaining candidate resource set (S'$_A$), the process does not guarantee that the newly selected resource can be signaled/reserved by an earlier SCI or the newly selected resource is able to signal/reserve the next pre-selected resource in a same SCI.

Figure 4:
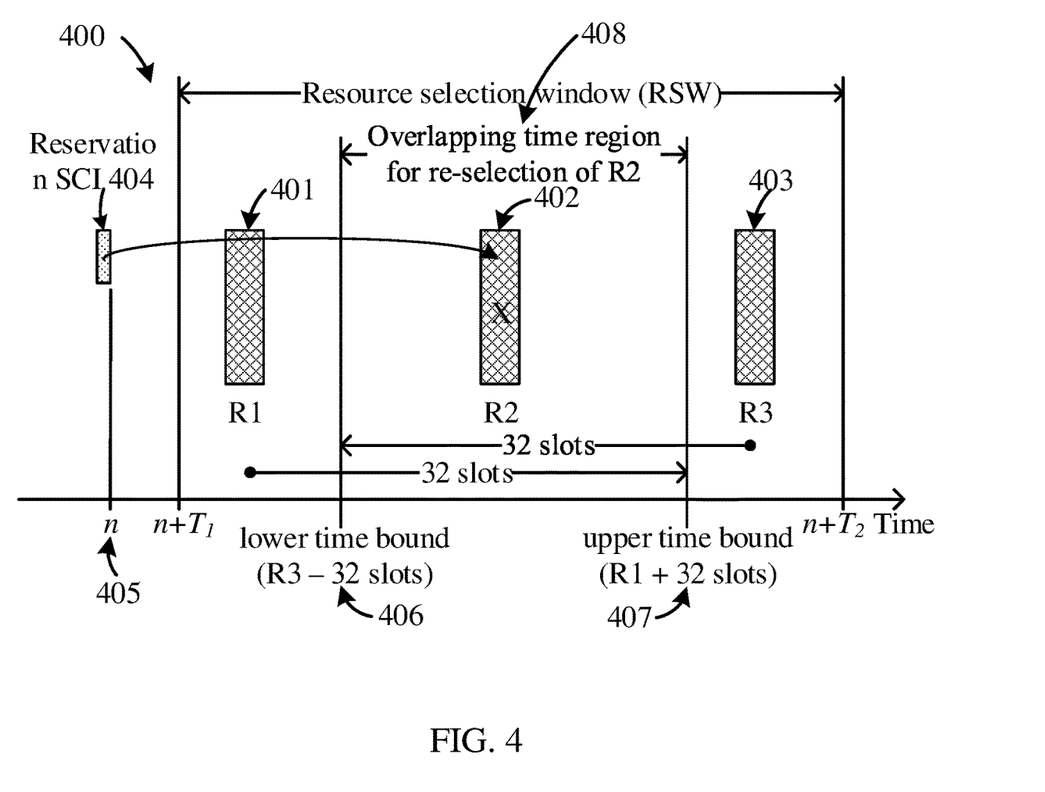
FIG. 4 is an exemplary illustration of a chain-based resource (re)selection scheme during resource re-evaluation according to an embodiment of the present disclosure.

FIG. 4 is an exemplary illustration of a chain-based resource (re)selection scheme during resource re-evaluation according to an embodiment of the present disclosure. In reference to diagram 400 in FIG. 4, an exemplary illustration of the proposed chain-based resource (re)selection scheme is depicted for a resource re-selection scenario during a re-evaluation of pre-selected SL resources. FIG. 4 illustrates that, in some embodiments, SL resources R1 401, R2 402, and R3 403 are already pre-selected resources from a Tx-UE but not yet announced/signaled to other UEs. Before transmitting PSCCH/PSSCH using the pre-selected SL resource R1 401 and announcing/signaling SL resources R2 and R3 for the first time via SCI format 0-1 in the SL resource R1, the Tx-UE detects a SCI transmission in 404 reserving or partially reserving the same SL resource R2 402 from another UE. Based on the detection of the reservation SCI in 404, the Tx-UE triggers a resource re-evaluation process in slot n 405 before the planned SL PSCCH/PSSCH transmission in SL resource R1 401 for all of the pre-selected SL resources R1, R2, and R3 to determine if they are still part of the remaining candidate resource set (S'$_A$). Assuming the pre-selected SL resource R2 402 is no longer part of the remaining candidate resource set (S'$_A$) due to the reservation from another UE and the Tx-UE needs to perform re-selection of a new SL resource to replace SL resource R2 402. For the proposed chain-based resource re-selection scheme, instead of randomly selecting a new SL resource from the remaining candidate resource set (S'$_A$), the Tx-UE first determines an appropriate time region within which it can perform re-selection of SL resource R2.

In some embodiments, in order to ensure that the new/replacement SL resource of R2 is within at least 32 slots from the previous pre-selected resource so that the newly re-selected SL resource R2 can still be reserved/signaled by PSCCH transmitted in SL resource R1 401, an upper time bound at (R1+32 slots) 407 for the time region can be established. Similarly, in order to ensure the new/replacement resource of R2 is within at least 32 slots from the next pre-selected resource so that PSCCH transmitted from the newly re-selected SL resource R2 is still able to reserve/signal the next pre-selected SL resource R3 403, an lower time bound at (R3−32 slots) 406 for the time region can be established. As such, the re-selection of SL resource R2 402 can be within an overlapping time region 408 between the lower time bound 406 and the upper time bound 407. If a time gap/distance separation between SL resources R1 401 and R3 403 is less than or equal to 32 slots (where the slots could be physical or logical slots), the re-selection/replacement resource for SL resource R2 402 can be in any of non-taken slots within the resource chain. Otherwise, the re-selection/replacement SL resource for R2 402 can be restricted within the lower time bound 406 and the upper time bound 407 as previously described and illustrated in diagram 400. If there is no available/candidate resource within the time bound 408, the Tx-UE re-selects another pre-selected SL resource (R1 or R3) together with R2 402, such that the newly selected replacement resources still satisfy the 32 slots time restriction of chain selection/reservation. For example, both R1 and R2 SL resources are re-selected such that the new SL resource R2 can be within 32 slots from SL resource R3 and the new SL resource R1 is within 32 slots from the new SL resource R2.

Figure 5:
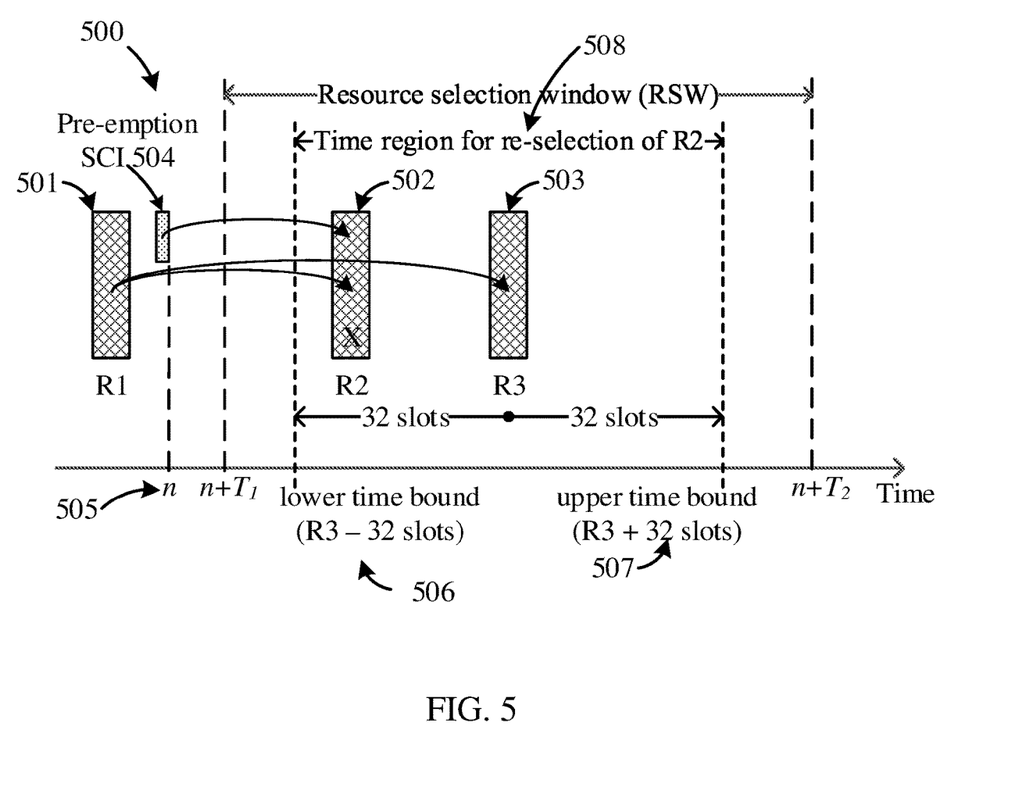
FIG. 5 is an exemplary illustration of a chain-based resource (re)selection scheme during resource pre-emption according to an embodiment of the present disclosure.

FIG. 5 is an exemplary illustration of a chain-based resource (re)selection scheme during resource pre-emption according to an embodiment of the present disclosure. In reference to diagram 500 in FIG. 3, an exemplary illustration of the proposed chain-based resource (re)selection scheme is depicted for a resource re-selection scenario due to SL resource pre-emption. FIG. 5 illustrates that, in some embodiments, SL resources R1 501, R2 502, and R3 503 are selected SL resources from a Tx-UE for PSCCH/PSSCH transmissions. During the transmission of PSCCH in SL resource R1 501, SL resources R2 502 and R3 503 are announced/signaled in the same SCI format 0-1 for future reservation. After the PSCCH transmission in SL resource R1 501, the Tx-UE detects a SCI with higher L1 priority than its own transmitted in 504, pre-empting/reserving (either fully or partially) the same R2 SL resource 502 from another UE. Based on the detection of the pre-emption SCI in 504, the Tx-UE triggers a resource re-selection procedure in slot n 505 before the planned PSCCH/PSSCH transmission in SL resource R2 502 for re-selecting a new/replacement resource for the pre-empted SL resource R2 502.

In some embodiments, for the proposed chain-based resource re-selection scheme, instead of randomly selecting a new resource from the remaining candidate resource set ($S'_A$), the Tx-UE first determines an appropriate time region within which it can perform re-selection of SL resource R2. Since the timing of resource re-selection trigger at time n 505 is after the PSCCH/PSSCH transmission slot of SL resource R1 (i.e., R1 is already a past and used SL resource), the slot timing for a new SL resource R2 does not need to be within 32 slots from SL resource R1 501 for the purpose of chain reservation. However, for the proposed chain-based resource re-selection scheme, a newly re-selected SL resource R2 can still be within 32 slots from the already announced/signaled SL resource R3 503, in order to ensure that the new/replacement resource of SL resource R2 is still able to signal/reserve or to be signaled/reserved by SL resource R3 503. To achieve this, a time region for re-selection of R2 508 can be established by the Tx-UE with a lower time bound at (R3−32 slots) at 506 and an upper time bound (R3+32 slots) at 507. If there is no remaining candidate resource available within the time bound 508, the Tx-UE also re-selects the other already announced/signaled SL resource R3 503 together with R2 502, such that the newly selected replacement resources still satisfy the 32 slots time restriction of chain selection/reservation. For example, both R2 and R3 SL resources are both re-selected and that the new SL resources R2 and new R3 are within 32 slots to each other.

In summary, in some embodiments, in the present disclosure of inventive methods of radio resource (re)selection intended for used in new radio-sidelink (NR-SL) communication, a transmitter user equipment (Tx-UE) selects one or more SL resources to transmit a SL transport block (TB) according to a transmit time portion(s) within a resource selection window (RSW) and/or based on a time bound that is relative to the neighboring resources. By spreading out the selection of resources over time, prioritizing a certain time portion within the RSW for resource selection, and/or following a timing selection restriction, the proposed inventive methods minimizes the risk of transmission (Tx) collision and pre-selected resources being reserved or pre-empted by another UE, and at the same time takes advantage of the indication/advanced reservation of future SL resources in sidelink control information (SCI) signaling, and thus improving the overall system performance.

In some embodiments, for the proposed resource (re)selection schemes, the Tx-UE first receives network configuration or obtains pre-configuration signalling containing information for a SL "selected" (as known as mode 2) transmission resource pool, and performs SL resource sensing/monitoring slots which belong to the (pre-)configured resource pool within a sensing window, where the resource sensing/monitoring operation comprises of decoding physical sidelink control channel (PSCCH) to extract information on one or more of the time and frequency resource assignments for the current and future intended/reserved resources, resource reservation period ($P_{rsvp\_RX}$) and priority ($prio_{RX}$) from the received SCI format 0-1 ($1^{st}$ stage SCI), and measuring RSRP levels (based on PSCCH-RSRP or PSSCH-RSRP) for the received SCI format 0-1 in these slots.

Commercial interests for some embodiments are as follows. 1. Providing more reliable and faster NR sidelink radio transmission performance from reduced resource congestion and transmission collisions. 2. Providing reduced risk of resource re-selection and terminal processing power consumption from early selection and chain-reservation. 3. Providing good communication performance. 4. Providing high reliability. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product.

Figure 6:
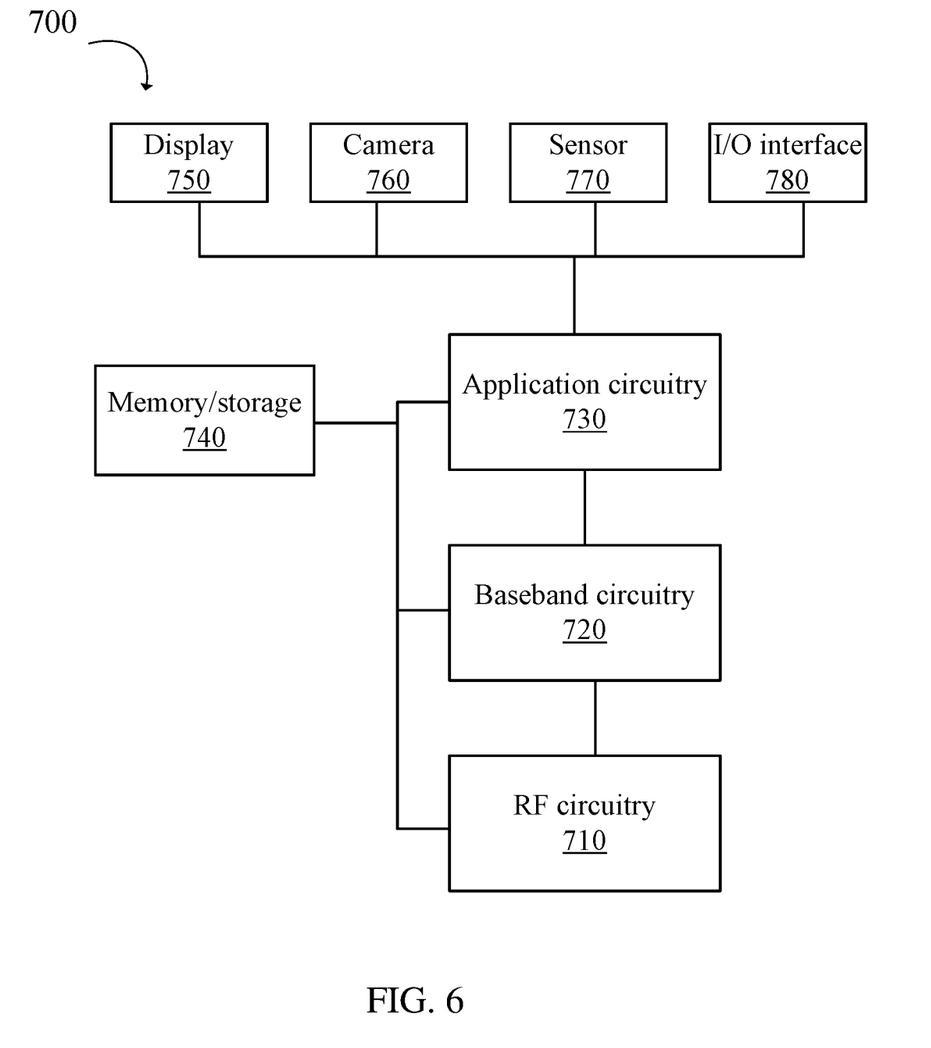
FIG. 6 is a block diagram of a system for wireless communication according to an embodiment of the present disclosure.

FIG. 6 is a block diagram of an example system 700 for wireless communication according to an embodiment of the present disclosure. Embodiments described herein may be implemented into the system using any suitably configured hardware and/or software. FIG. 6 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A user equipment of resource allocation, comprising:
a memory;
a transceiver; and
a processor coupled to the memory and the transceiver;
wherein the processor is configured to:

perform monitoring on slots of a resource pool;

exclude one or more sidelink resources from a candidate resource set in the resource pool; and select one or more sidelink resources using a timing based selection from the remaining candidate resource set in the resource pool;

wherein selecting one or more sidelink resources using the timing based selection from the remaining candidate resource set is according to a chain-based selection scheme, wherein one or more slot regions within a time constraint of a maximum time gap from a previous sidelink resource and/or a next sidelink resource are identified for selection.

2. The user equipment of claim 1, wherein the resource pool is network configured or pre-configured.

3. The user equipment of claim 1, wherein the resource pool comprises a selected/mode 2 resource pool for sidelink transmission.

4. The user equipment of claim 1, wherein monitoring on the slots of the resource pool is performed by decoding a physical sidelink control channel (PSCCH) and measuring a reference signal received power (RSRP) during a sensing window in the resource pool.

5. The user equipment of claim 1, wherein excluding one or more sidelink resources from the candidate resource set is according to one or more information relating to L1 priority, time and frequency resource assignments, and reservation periodicity from a sidelink control information (SCI) and a RSRP threshold.

6. The user equipment of claim 1, wherein in the chain-based selection scheme, one or more sidelink resources are selected randomly from one or more slot regions.

7. The user equipment of claim 1, wherein in the chain-based selection scheme, one or more slot regions within the remaining candidate resource set are identified according to at least one of the followings:
a lower time bound of a slot region is defined by a time gap before a time slot of the next sidelink resource, and an upper time bound of the slot region is defined by a time gap after a time slot of the previous sidelink resource; or
the lower time bound and the upper time bound of the slot region are defined by a time gap before and after the time slot of the next sidelink resource, respectively; or
the upper time bound of the slot region is defined by a time gap after the time slot of the previous resource.

8. The user equipment of claim 1, wherein the maximum of all time gaps is smaller than or equal to 32 slots.

9. The user equipment of claim 7, wherein if there is no available/candidate sidelink resource between the lower time bound and the upper time bound, the processor re-selects replacement sidelink resources including the previous and/or the next resources.

10. A method of resource allocation of a user equipment, comprising:

performing monitoring on slots of a resource pool;

excluding one or more sidelink resources from a candidate resource set in the resource pool; and selecting one or more sidelink resources using a timing based selection from the remaining candidate resource set in the resource pool;

wherein selecting one or more sidelink resources using the timing based selection from the remaining candidate resource set is according to a chain-based selection scheme, wherein one or more slot regions within a time constraint of a maximum time gap from a previous sidelink resource and/or a next sidelink resource are identified for selection.

11. The method of claim 10, wherein the resource pool is network configured or pre-configured.

12. The method of claim 10, wherein the resource pool comprises a selected/mode 2 resource pool for sidelink transmission.

13. The method of claim 10, wherein monitoring on the slots of the resource pool is performed by decoding a physical sidelink control channel (PSCCH) and measuring a reference signal received power (RSRP) during a sensing window in the resource pool.

14. The method of claim 10, wherein excluding one or more sidelink resources from the candidate resource set is according to one or more information relating to L1 priority, time and frequency resource assignments, and reservation periodicity from a sidelink control information (SCI) and a RSRP threshold.

15. The method of claim 10, wherein in the chain-based selection scheme, one or more sidelink resources are selected randomly from one or more slot regions.

16. The method of claim 10, wherein in the chain-based selection scheme, one or more slot regions within the remaining candidate resource set or the resource selection window are identified according to at least one of the followings:
a lower time bound of a slot region is defined by a time gap before a time slot of the next sidelink resource, and an upper time bound of the slot region is defined by a time gap after a time slot of the previous sidelink resource; or
the lower time bound and the upper time bound of the slot region are defined by a time gap before and after the time slot of the next sidelink resource, respectively; or
the upper time bound of the slot region is defined by a time gap after the time slot of the previous resource.

17. The method of claim 10, wherein the maximum of all time gaps is smaller than or equal to 32 slots.

18. The method of claim 16, wherein if there is no available/candidate sidelink resource between the lower time bound and the upper time bound, the UE re-selects replacement sidelink resources including the previous and/or the next resources.

* * * * *